(12) United States Patent
Neir et al.

(10) Patent No.: US 10,173,483 B2
(45) Date of Patent: Jan. 8, 2019

(54) AUTOMATIC ELECTRONIC AIR PUMP

(71) Applicant: TorrX, Inc., Kirkland, WA (US)

(72) Inventors: Thomas Neir, Kirkland, WA (US); Sally Otten, Kirkland, WA (US)

(73) Assignee: TORRX, INC., Kirkland, WA (US)

( * ) Notice: Subject to any disclaimer, the term of this patent is extended or adjusted under 35 U.S.C. 154(b) by 214 days.

(21) Appl. No.: 14/951,162

(22) Filed: Nov. 24, 2015

(65) Prior Publication Data

US 2016/0144676 A1    May 26, 2016

Related U.S. Application Data

(60) Provisional application No. 62/084,523, filed on Nov. 25, 2014.

(51) Int. Cl.
*B60C 29/06* (2006.01)
*A63B 41/02* (2006.01)
*F04B 49/02* (2006.01)

(52) U.S. Cl.
CPC .......... *B60C 29/068* (2013.01); *A63B 41/02* (2013.01); *F04B 49/022* (2013.01)

(58) Field of Classification Search
CPC .... B60C 29/068; B60P 7/065; F04D 25/0673; F04D 17/16; F04D 27/008; F04D 25/06; F04D 29/601; F04D 25/08
USPC ................................ 73/146–148.8
See application file for complete search history.

(56) References Cited

U.S. PATENT DOCUMENTS

| | | | |
|---|---|---|---|
| D375,315 S | 11/1996 | Paul-Johansson | |
| 6,246,317 B1* | 6/2001 | Pickornik | B60C 23/007 340/442 |
| D454,358 S | 3/2002 | Davis et al. | |
| D520,521 S | 5/2006 | Angeletta | |
| D550,717 S | 9/2007 | Saunders et al. | |
| D556,215 S | 11/2007 | Saunders et al. | |
| D556,216 S | 11/2007 | Saunders et al. | |
| D556,217 S | 11/2007 | Saunders et al. | |
| D556,781 S | 12/2007 | Saunders et al. | |
| D559,866 S | 1/2008 | Saunders et al. | |
| D588,161 S | 3/2009 | Daniel | |
| D589,984 S | 4/2009 | Roesler | |
| D611,503 S | 3/2010 | Distler | |
| D634,755 S | 3/2011 | Sanders et al. | |
| 7,980,799 B1* | 7/2011 | Rioux | B60P 7/065 141/10 |
| D663,746 S | 7/2012 | Kwon | |
| D669,095 S | 10/2012 | Chang | |
| D798,911 S | 10/2017 | Chao | |
| D800,787 S | 10/2017 | Lahav et al. | |
| D801,928 S | 11/2017 | Yoshida et al. | |
| 9,879,682 B1* | 1/2018 | Beliveau | F04D 17/16 |
| D818,004 S | 5/2018 | Lee | |
| D823,344 S | 7/2018 | Malcolm | |

(Continued)

*Primary Examiner* — Charles Freay
*Assistant Examiner* — Lilya Pekarskaya
(74) *Attorney, Agent, or Firm* — Fenwick & West LLP

(57) ABSTRACT

An electronic air pump pressurizes object in either manual or automatic mode. In automatic mode, the electronic air pump determines air pressure needed to adjust an object to a set target pressure. The electronic air pump inflates or deflates the ball automatically until the air pressure inside the ball matches the preset value. In manual mode regulation of the air pressure is adjusted by a user.

10 Claims, 9 Drawing Sheets

(56) References Cited

U.S. PATENT DOCUMENTS

2005/0087559 A1* 4/2005 Smith .................... B60P 7/065
                                                        222/251
2005/0229985 A1* 10/2005 Saxenfelt ............... A63B 41/02
                                                        138/93
2009/0314354 A1* 12/2009 Chaffee ................ G05D 16/208
                                                        137/14

* cited by examiner

AUTOMATIC ELECTRONIC AIR PUMP

CROSS REFERENCE TO RELATED APPLICATION

This application claims the benefit of U.S. Provisional Application No. 62/084,523, filed Nov. 25, 2014, which is incorporated by reference herein in its entirety.

BACKGROUND

1. Field of Art

The disclosure generally relates to the field of air pumps, and more specifically to an electronic air pump that operates in multiple modes.

2. Description of the Related Art

Sports balls (such as basketballs, soccer ball, footballs, and the like) are the focal element in their sporting environment. Improperly inflated sports balls diminish the quality of a sports game leading to an unsatisfactory player experience, ball damage, or injury. Hand held air pumps pressurize slowly and if no pressure gauge is incorporated, it is difficult to determine if a sports ball is inflated to the correct pressure. Additionally, hand held pumps have a tendency to introduce torsion while pressurizing causing inflation needles to bend and/or snap off.

BRIEF DESCRIPTION OF DRAWINGS

The disclosed embodiments have other advantages and features which will be more readily apparent from the following detailed description of the invention and the appended claims, when taken in conjunction with the accompanying drawings, in which:

Figures (FIGS. 1A-1C illustrate an electronic air pump in a closed position, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1A:
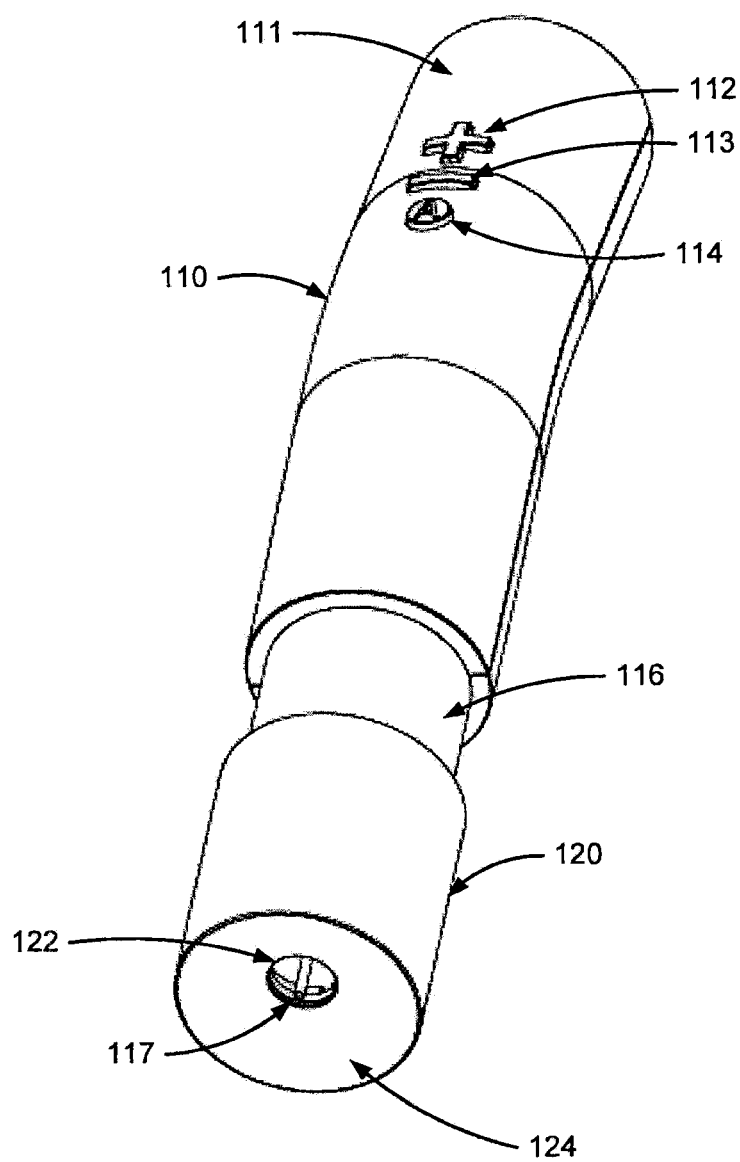
Figure 1B:
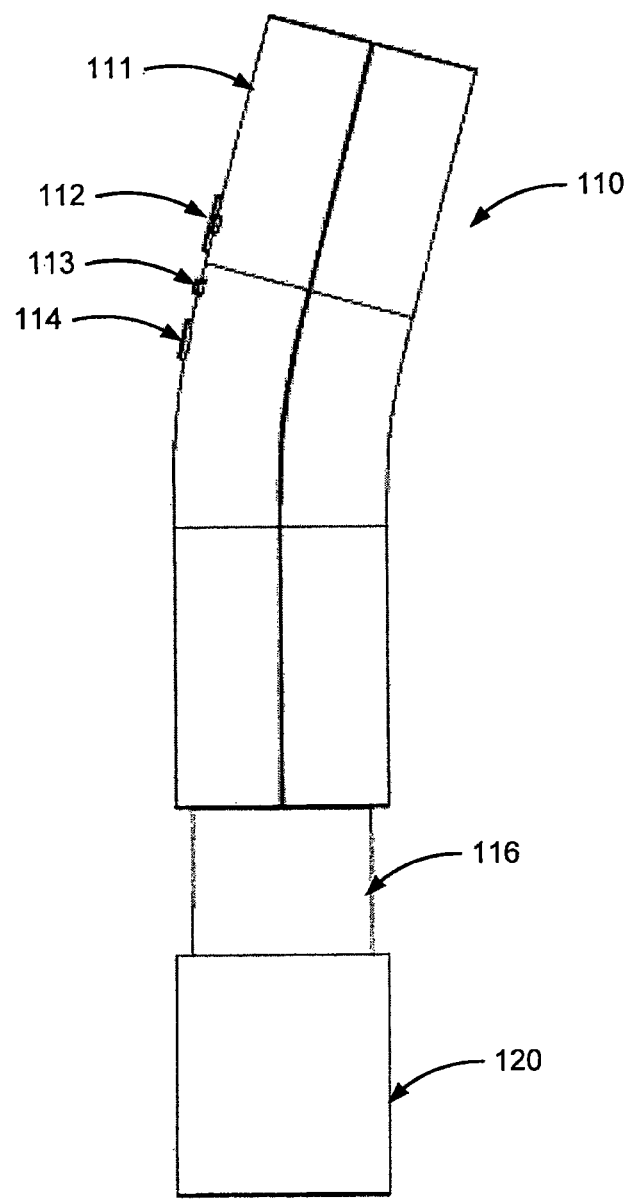
Figure 1C:
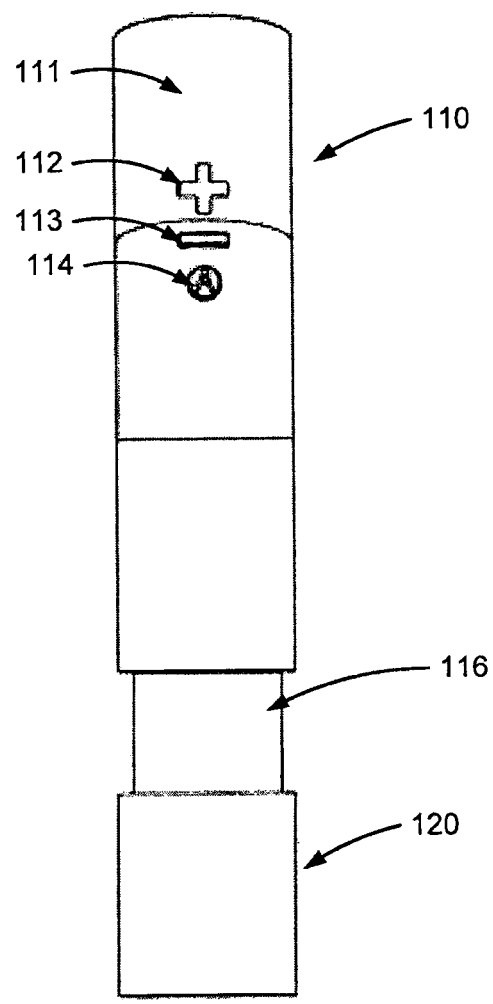
Figure 2A:
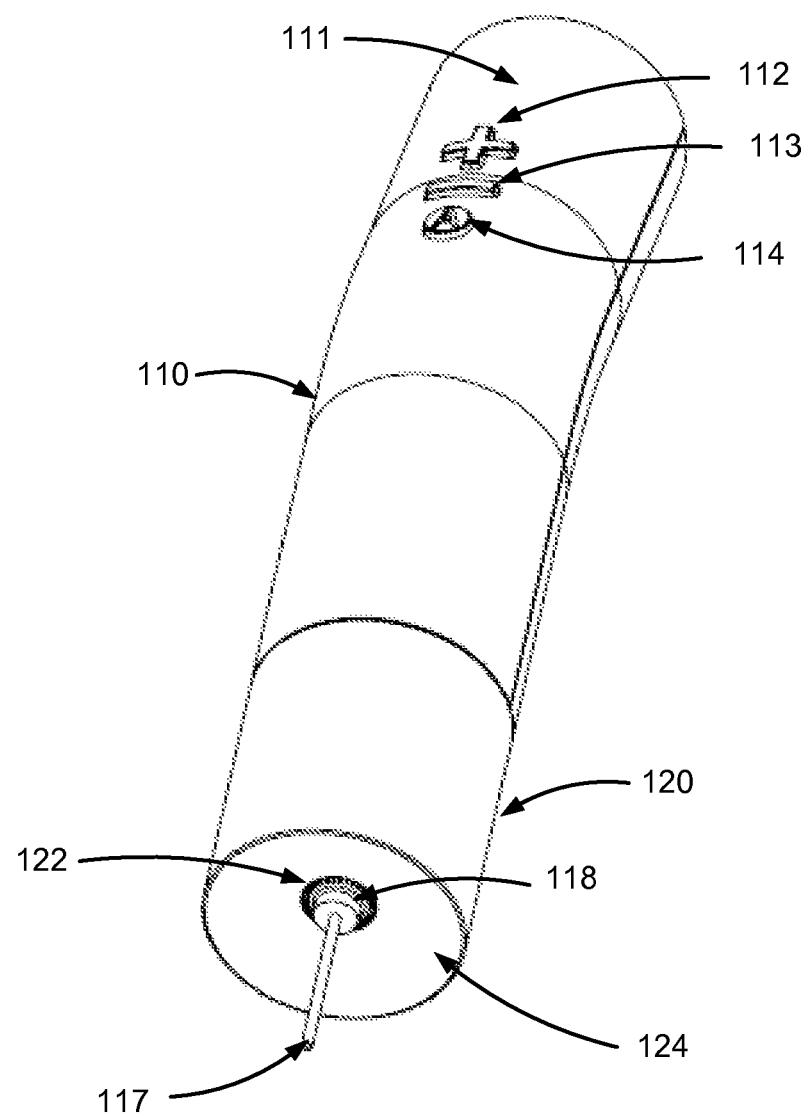
FIGS. 2A-2C illustrate the electronic air pump in an open position, according to one embodiment.
Figure 2B:
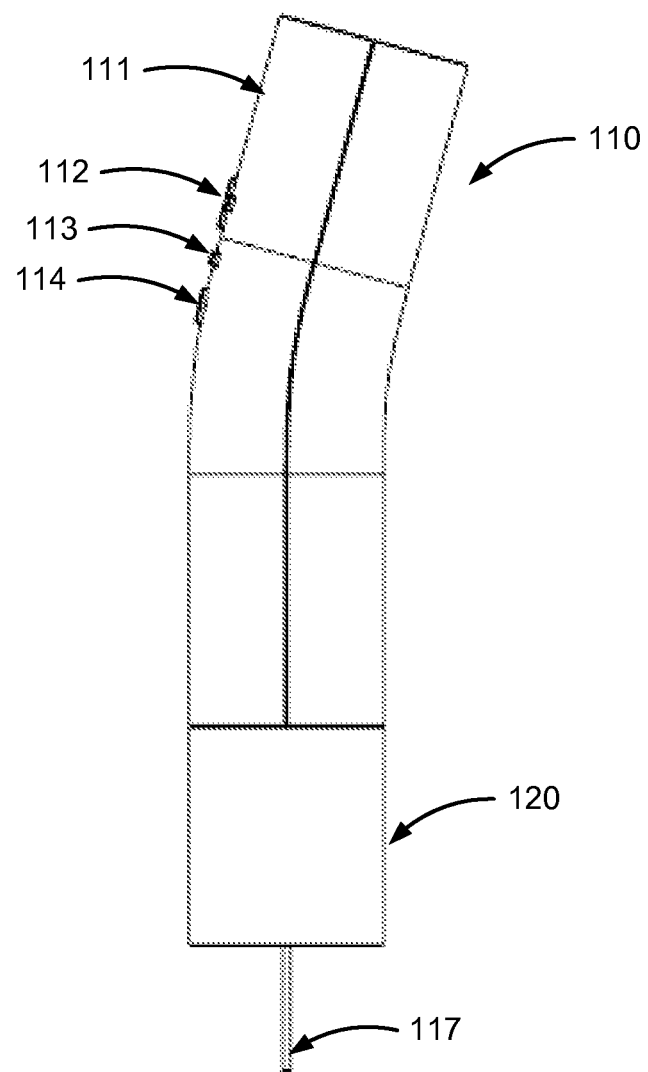
Figure 2C:
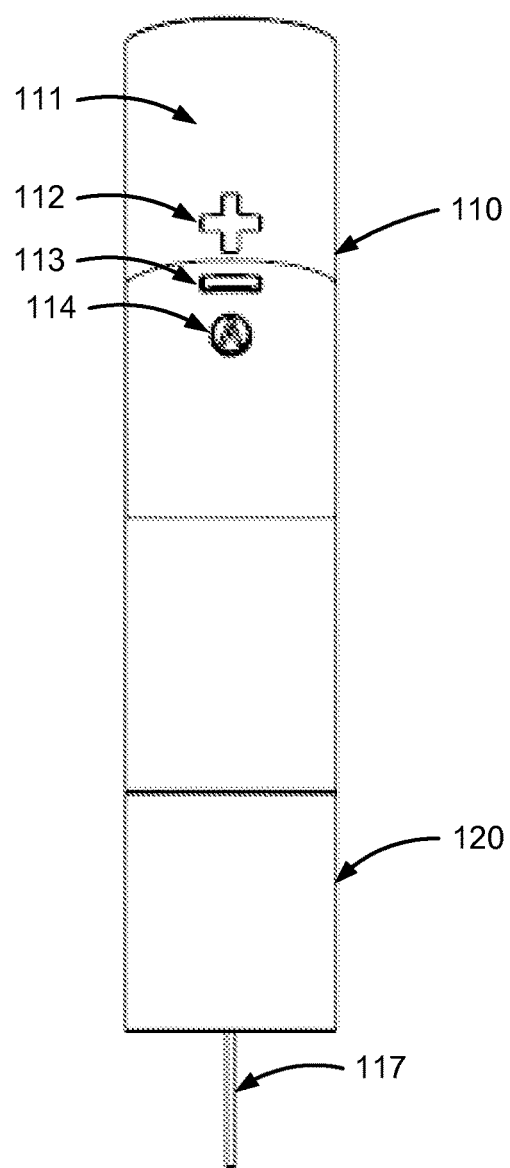

FIGS. 1A-1C illustrate an electronic air pump 100 in a closed position (may also be referred to as the off position) and FIGS. 2A-2C illustrate the electronic air pump 100 in an open position (may also be referred to as the on position). In the closed position, the electronic air pump 100 is off, meaning that there is a break in the circuitry of the electronic air pump 100 and the electronic pump 100 is inoperable for purposes of filling an object with air. In the open position, the electronic air pump 100 is on, meaning that the components of the electronic air pump 100 are receiving electricity and the electronic air pump 100 can be used to fill an object.

FIG. 1A illustrates a perspective view of the electronic air pump 100 in the closed position, FIG. 1B illustrates a side view of the electronic air pump 100 in the closed position, and FIG. 1C illustrates a forward view of the electronic air pump 100 in the closed position. The electronic air pump 100 includes a main body casing 110, a recessed casing 116, and a cap 120. In one embodiment, the main body casing 110 is in a cylindrical shape and is structured to form a cavity that includes electronic and mechanical components. The main body casing 110 is coupled to the recessed casing 116. The recessed casing 116 is structured in a substantially similar cylindrical shape to the main body casing 110 but with a small diameter than that of the main body casing 110 and of the cap 120. The recessed casing 116 includes a threaded aperture 118 (not shown in FIG. 1A, but shown in FIG. 2A as described below) used to securely attach a needle 117.

The recessed casing 116 is coupled to the cap 120. The cap 120 is hollow cylindrical covering with a similar diameter as the main body casing 110. As illustrated by FIG. 1A, in the closed position (off position), the cap 120 encloses the needle 117, thereby protecting the needle 117 when the electronic air pump 100 is not being used. This allows a user, for example, to place the electronic air pump 100 in a bag (e.g., sports equipment bag) without having to be concerned that the needle 117 will bend or break.

By the recessed casing 116 having a smaller diameter than that of the cap 120, the cap 120 is able to slide along and over the recessed casing 116 towards the main body casing 110. In one embodiment, for the cap 120 to slide towards main body casing 110, a user has to perform a twisting motion with the cap 120 as if the user was screwing on the cap. The cap 120 can be slid along the recessed casing 116 until the cap 120 is flush (joined) with the main body casing 110.

When the cap 120 is flush with the main body casing 110, the electronic air pump 100 is in the open position (on position). FIG. 2A illustrates a perspective view of the electronic air pump 100 in the open position, FIG. 2B illustrates a side view of the electronic air pump 100 in the open position, and FIG. 2C illustrates a forward view of the electronic air pump 100 in the open position. As illustrated by FIG. 2A, a bottom surface 124 of the cap 120 includes a circular aperture 122 that allows the needle 117 to become exposed when the electronic air pump 100 goes from the closed position to the open position. FIG. 2A illustrates a portion of the threaded aperture 118 used to securely attach the needle 117 to the recessed casing 116

In the open position, the needle 117 can be inserted into an object (e.g., a sports ball) for pressurizing. In one embodiment, bottom surface 124 of the cap 120 creates a seal when flush against an object being pressurized. In one embodiment, the bottom surface 124 is made of a pliable material (e.g., foam or rubber) that allows the bottom surface 124 to take the shape of the object being pressurized for forming the seal. In one embodiment, the bottom surface 124 is in a concave shape.

In one embodiment, the electronic air pump 100 includes a pair of magnets. In one embodiment, the first magnet from the pair is included on the main body casing 110 and the second magnet from the pair is included on the cap 120. In the open position, the magnets are coupled and this causes the electronic air pump 100 to turn on. When the electronic air pump 100 goes from the open position to the closed position, the magnets become separated, which causes the electronic air pump 100 to turn off.

As illustrated by FIGS. 1A and 2A, the main body casing 110 includes a dead front display 111 and input mechanisms 112, 113, and 114. In one embodiment, the dead front display 111 includes a transmissive film and an LED matrix. When the electronic air pump 100 is in the open position (on), the LED matrix emits light which is directed outwardly through the transmissive film improving clarity, brightness, and readability in low light or under direct sunlight conditions. When the electronic air pump 100 is in the closed position (off) and the LED matrix is de-energized, the dead front display 111 is indistinguishable from the main body casing 110 (the dead front display 111 is not visible to a user).

In one embodiment, the LED matrix includes three 7-segment displays configured to indicate up to three digits of pressure indication. In one embodiment, the pressure is displayed in imperial units of pounds per square inch (PSI) from 0.0 to 15.0 PSI and metric units of bar from 0.00 to 1.03 bars. The resolution for imperial units is in tenths of PSI increments while bars are in increments of hundredths.

The input mechanisms 112, 113, and 114 are configured to allow a user of the electronic air pump 100 to use the electronic air pump 100 for pressurizing an object to a desired pressure. The input mechanisms 112, 113, and 114 are structured on the front face of the electronic air pump 100 and align below the dead front display 111. The input mechanisms 112, 113, and 114 protrude from analogous shaped openings in the main body casing 110 and are made from a material (e.g. polymer plastic) that gives a user a tactile impression.

Input mechanism 114 (also referred to as the setting button) allows a user to set the electronic air pump 100 in different modes. In one embodiment, through input mechanism 114, when the electronic air pump 100 is in the open position, the electronic air pump 100 can be set in manual mode or in automatic mode. The dead front display 111 indicates the current mode of the pump 100. If the user wishes to switch between modes, the user presses on the input mechanism 114 twice consecutively. For example, if the electronic air pump 100 is in manual mode and the user presses on the input mechanism 114 twice consecutively, the electronic air pump 100 switches to automatic mode. If the user wishes to change back to manual mode, the user presses he input mechanism 114 again twice consecutively.

In manual mode, a user manually indicates how long the electronic air pump 100 should inflate or deflate using input mechanisms 112 and 113. If the user wishes to inflate an object (increase the pressure of the object), the user holds down input mechanism 112. The electronic air pump 100 will continue to inflate the object as long as the input mechanism 112 is pressed. Once the input mechanism 112 is released, the electronic air pump 100 stops inflating the object. On the other hand if the user wishes to deflate an object (decrease the pressure of the object), the user holds down input mechanism 113. The electronic air pump 100 will continue to deflate the object as long as the input mechanism 113 is pressed. Once the input mechanism 113 is released, the electronic air pump 100 stops deflating the object.

In automatic mode, a user sets a target pressure for an object into which the needle 117 has been inserted and the electronic air pump 100 automatically pressurizes (inflates or deflates) the object to the target pressure. The user sets the target pressure using input mechanisms 112 and 113. The dead front display 111 displays a current value of the target pressure. In one embodiment, the display automatically displays the target pressure that it was previously set to, for example, when pressurizing another object. If the user wishes to increase the target pressure, the user presses on input mechanism 112 until the desired pressure is reached. If the user wishes to decrease the target pressure, the user presses on input mechanism 113 until the desired pressure is reached. The dead front display 111 shows the current value of target pressure as it increased or decreased. Once the desired target pressure has been set (desired value has been reached), the user provides an input indicating that the pressurization to the target pressure start. In one embodiment, the user provides the input by pressing on input mechanism 114 once. When the input is provided, the electronic air pump 100 automatically pressurizes the object to the target pressure. When the target pressure is reached, the electronic air pump 100 outputs an audio signal to indicate the target pressure has been reached. The audio signal may be a specific sound or audio pattern.

Input mechanism 112 (also referred to as an inflate button 112) is in the shape of a plus symbol. As described above, when pressed and held in manual mode, it causes an object connected to the electronic air pump 100 via the needle 117 to be inflated until the user releases the input mechanism 112. In automatic mode, the input mechanism 112 is pressed to increase the value of the target pressure being set.

Input mechanism 113 (also referred to as a deflate button 113) is in the shape of a minus symbol. Similar to input mechanism 112, when pressed and held in manual mode, it causes an object connected to the electronic air pump 100 via the needle 117 to be deflated until the user releases the input mechanism 113. In automatic mode, the input mechanism 113 is pressed to decrease the value of the set target pressure.

In one embodiment, pump 100 has a small form factor (e.g., a height of 20 to 30 centimeters and a diameter of 5 to 10 centimeters), and is lightweight (e.g., 170 to 340 grams). The electronic air pump 100 can be rigid (e.g., plastic, metal, fiberglass, etc.) or pliable (e.g., neoprene, etc.). The pump 100 may be configured for use in various elements. For example, the pump electronic air 100 may comprise a water resistant enclosure.

Figure 3:
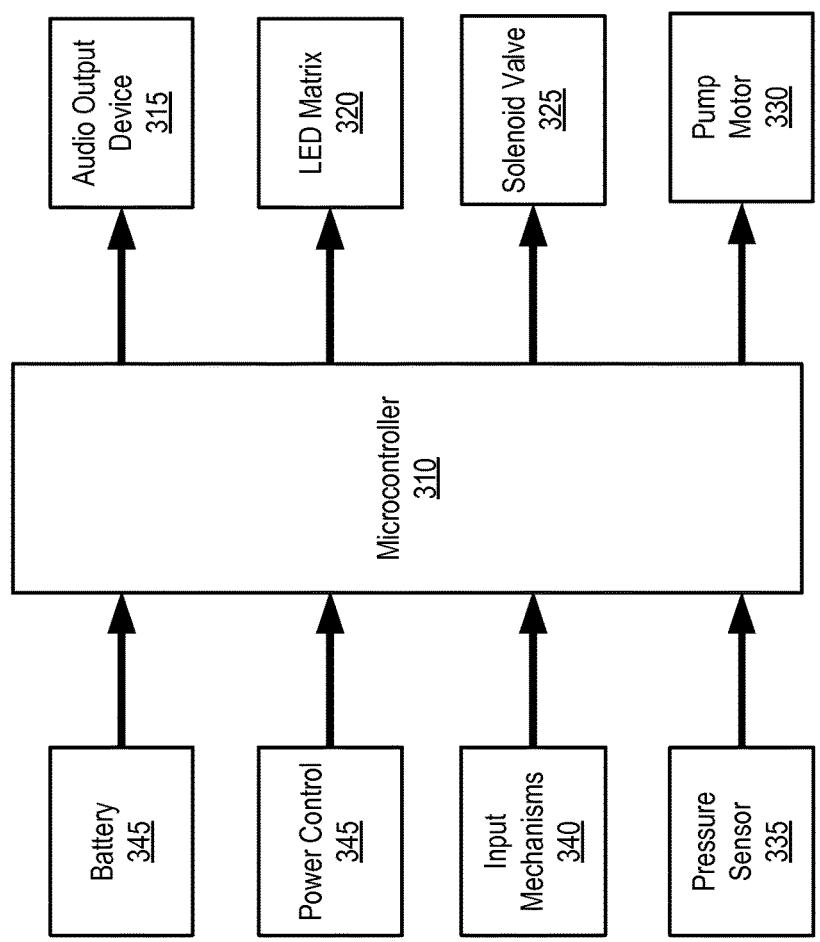
FIG. 3 is a block diagram illustrating components of the electronic air pump, according to one embodiment.

FIG. 3 is a block diagram illustrating the components of the electronic air pump 100, according to one embodiment. One or more of the components are included within the electronic air pump 100 (e.g., within the main body casing 110). In the embodiment, the electronic air pump 100 includes a microcontroller 310, an audio output device 315, LED matrix 320, solenoid valve 325, pump motor 330, pressure sensor 335, power control 345, input mechanisms 340, and a battery 345.

In one embodiment, the microcontroller 310 is an integrated circuit containing one or more processors and one or more memories. The microcontroller 310 manages functionality for the electronic air pump 100. As part of the functionality, the microcontroller 310 manages the pump's pressurization process through operational algorithms stored in memory and by coordinating the activity between components. The processes for pressurization may vary depending on the operational mode (manual, automatic) selected by a user. These operational algorithms will be further described below in conjunction with FIG. 4 and FIG. 5.

The microcontroller 310 controls the behavior of the various components of the electronic air pump 100 through, for example, general purpose input/output (GPIO) buses or by pulse width modulation (PWM). An audio output device 315 is electronically coupled to the microcontroller 310. In one embodiment, the audio output device 315 is a speaker. When the electronic air pump 100 is in automatic mode and a target pressure is reached, the audio output device 315 receives a signal from the microcontroller 310. In response to the signal, the audio output device 315 outputs an audible alarm.

The LED matrix 320 is connected to the microcontroller 310, for example, through a GPIO bus. The LED Matrix 320 receives instructions to display pressure measurement data. In other embodiments, other types of visual output devices may be used other than an LED matrix 320. The solenoid valve 325 is used to deflate an object (e.g., a sports ball). The solenoid valve 325 can be precisely opened and closed by the microcontroller 310. When it is necessary to deflate an object, the microcontroller 310 provides a signal (e.g., pulse width modulation signal) to the solenoid valve 325 indicating that that the solenoid value 325 be opened. In response to the signal, the solenoid valve 325 is opened. When microcontroller 310 provides a signal indicating that the solenoid valve 325 close, the solenoid valve 325 is closed.

The pump motor 330 provides airflow into an object being pressurized. When the pump motor 330 is turned on by the microcontroller 310, the pump motor 330 forces air into the object being pressurized via the needle 117.

The pressure sensor 335 measures air pressure inside the electronic air pump 100. In one embodiment, the pressure sensor 335 takes ten air pressure sample measurements at 0.5 milliseconds intervals then averages them together to generate a usable air pressure measurement that is provided to the microcontroller 310.

When the pump motor 330 is turned off, the solenoid valve 325 is closed, and the needle 117 is inserted into an object, the pressure measured by the sensor in the pump will be the same or near the same as that of the object because the pump and the object will have pressure equilibrium, however, when the pump is on and the solenoid valve 325 is closed, the pressure measured by the pressure sensor 335 and the pressure inside the object will be different. Therefore since measured pressure is different, the pressure inside the object is estimated based on the sensor measurement.

In one embodiment, to estimate the air pressure of the object, the microcontroller 310 uses multivariate linear regression. The predicted air pressure allows the microcontroller 310 to regulate air flow so it can accurately set target pressure without user intervention. To estimate the air pressure inside the object, first a pressure difference is calculated with the following linear equation: $PD = a_0 + a_1 xP + a_2 xV$, where PD=pressure difference, P=Pressure in pump motor 330, V=Battery Voltage, Ax=Fixed coefficients. The pressure difference between the electronic air pump motor 100 and the object is a function of pressure of air in the electronic air pump, size of needle 117 orifice, air flow rate and temperature. The effect of temperature is relatively small, therefore ignored for the purposes of calculation. The needle 117 orifice is assumed to be constant. Air flow rate is determined by the pump motor 330 and pump flow rate is a function of air pressure and pump motor 330 speed. Motor speed is a function of drive voltage and load. In this case, the load is the pump motor 330, is a function of air pressure. Motor drive voltage is derived from a voltage of the battery. Once the pressure difference is calculated the estimated pressure of the difference is calculated by adding the pressure difference to the pressure rate measured by the sensor. In another embodiment a table of measurements is used to calculate the pressure difference through interpolation of the measurements. In yet another embodiment, the multivariate linear regression is used to generate a higher-order approximation.

In instances of deflation, the pump motor 330 is deactivated and the solenoid valve 325 is opened. The measurements taken by the pressure sensor 335 will not reflect the actual air pressure inside the object because of active airflow out from the object. Therefore, to allow for pressure difference stabilization, in one embodiment, the solenoid valve 325 should be closed for a period of time of 0.5 seconds before the pressure sensor 335 measures the air pressure deflation. In another embodiment, the pressure inside the object is estimated during/using the multivariate linear equations is similar to the one described above.

Input mechanisms 340 refer to the input mechanisms 112, 113, and 114 described above for FIGS. 1A and 2A. In one embodiment, the input mechanisms are coupled electrically over a GPIO bus to the microcontroller 340. A power control device 345 connects and regulates electricity flow for the electronic components of the electronic air pump 100. Electricity flows to the components when a magnetic pair located in the main body casing 110 and protective cap 120 are coupled. In another embodiment, one magnet from the pair is included in the recessed portion 116 and the other is located on cap 120. The magnets become coupled when the electronic air pump 100 is in the open position. Electricity flows from the battery 345 to the electronic components of the electronic air pump 100. The battery 345 is composed of a rechargeable lithium-ion material and is accessible through a removable flip cap on the top surface of the electronic air pump 100. In one embodiment, the battery 345 is connected and charged through a mini-USB connector and in another embodiment through a micro-USB connector. The battery 345 provides power to the microcontroller 300 and the other electronic components of the electronic air pump 100. Additionally, the voltage level of the battery 345 is measured and used by the microcontroller 310 in pressure difference calculations, as described above.

Figure 4:
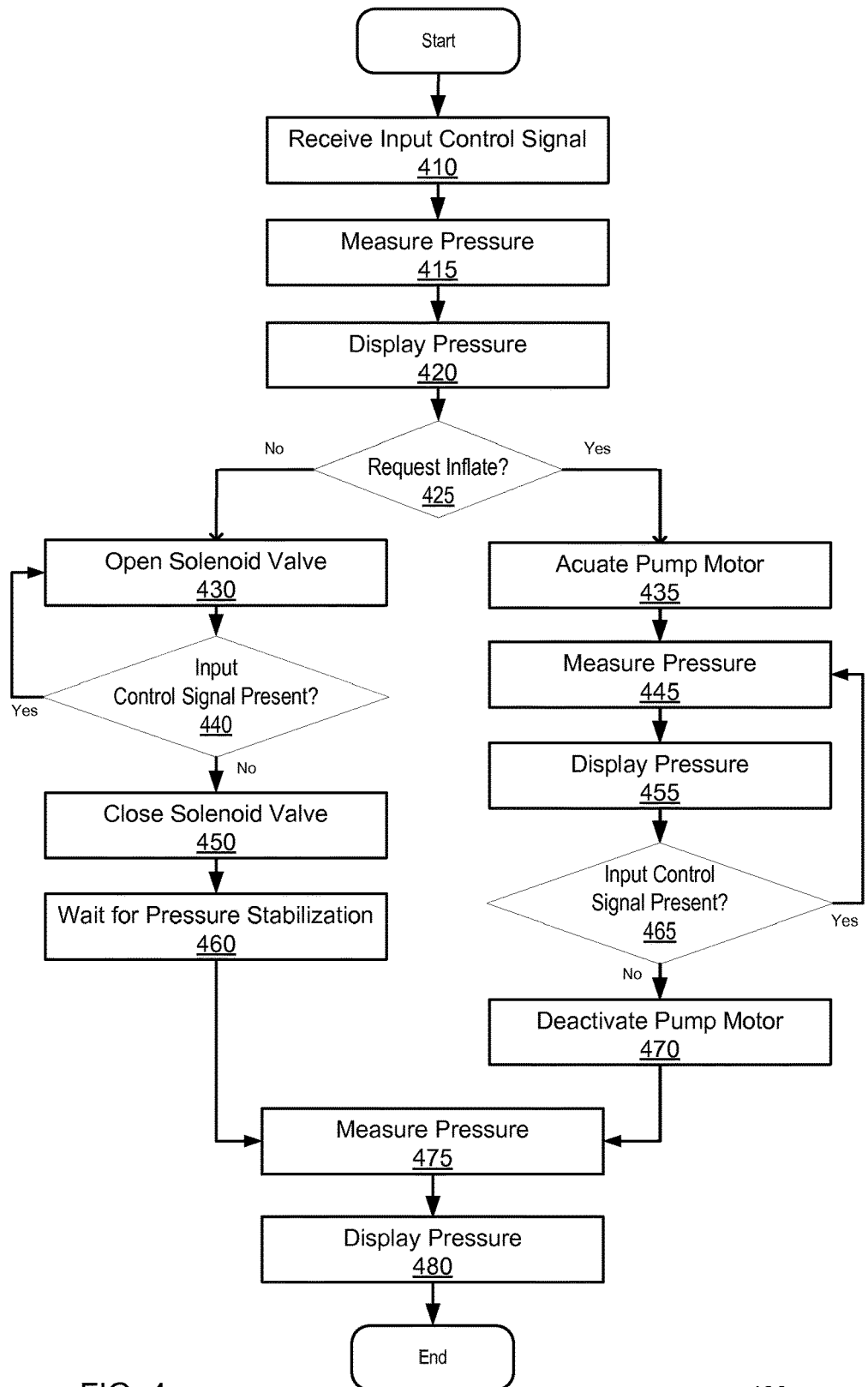
FIG. 4 is a flow chart illustrating a process performed by the electronic air pump operating while operating in manual mode, according to one embodiment.

FIG. 4 is a flow chart illustrating a process performed the electronic air pump 100 when operating in manual mode, according to one embodiment. Assume for purposes of this example that the electronic air pump 100 is in manual mode and the needle 117 has been inserted into an object for pressurizing. The electronic air pump 100 starts the process by waiting to receive 410 an input control signal from input control mechanisms 112 or 113. When an input control signal is received, the electronic air pump 100 measures 415 pressure at the pump motor 330. The electronic air pump 100 displays 420 the pressure on the dead front display 111. The electronic air pump 100 then determines whether the input control signal is a request 425 to inflate or deflate.

If the input control signal is an inflation request, the electronic air pump 100 actuates 435 the pump motor 330 forcing air through the needle 117. While air is flowing through the needle 117, the electronic air pump 100 again measures 445 the pressure at the pump motor 330 and displays 455 a pressure value on the dead front display. In one embodiment, the value displayed is an estimated pressure value determined based on the measured value and the previously described multivariate linear equation. In another embodiment, the value displayed is solely the value measured at the pump motor 330.

The pump 100 determines 465 whether the input control signal is still being received (if the inflate button remains pressed). If the input control signal is still present, the electronic air pump 100 will repeat steps 445, 455, and 465. If the input control signal is not present (the inflate button is no longer being pressed), the electronic air pump 100 deactivates 470 the pump motor 330, halting air flow through the needle 117. The pump 100 takes a final pressure measurement and displays the measure pressure on the dead front display 111.

Returning to step 425, if the input control signal is determined to be a request 425 to deflate, the electronic air pump 100 opens 430 the solenoid valve 325 allowing air to flow out from the object. The electronic air pump 100 then determines 440 if the input control signal is still being received (deflate button is still being pressed). If so, the electronic air pump 100 keeps 430 the solenoid valve 325 open and repeats steps 430 and 440. If the input control signal is no longer present (deflate button no longer being pressed), the electronic air pump 100 closes 450 the solenoid valve 325, stopping the deflation of the ball. In one embodiment, the electronic air pump 100 waits 460 500 milliseconds for pressure stabilization before the electronic air pump 100 measures 475 the pressure. The pump 100 displays the measure pressure on the dead front display 111. In other embodiment, the stabilization period may be a different amount of time. In another embodiment, while the solenoid valve 325 is open, the pump 100 periodically measures the pressure via the pressure sensor 335 and estimates the pressure inside the object. The estimated pressure is displayed on the dead front display 111 while the solenoid valve 325 is open.

Figure 5:
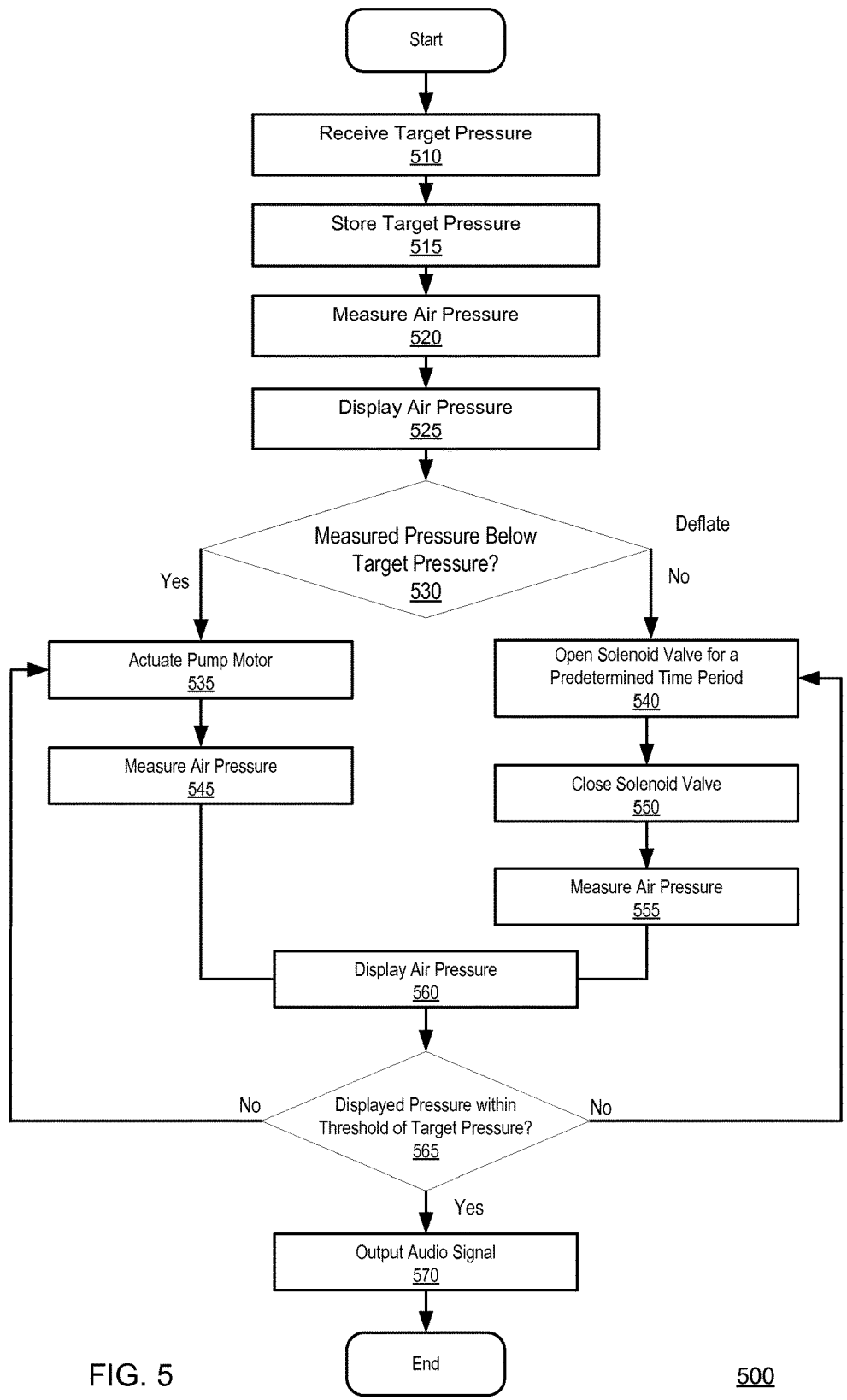
FIG. 5 is a flow chart illustrating a process performed by the electronic air pump while operating in automatic mode, according to one embodiment.

FIG. 5 is a flow chart illustrating a process performed by the electronic air pump 100 when operating in automatic mode, according to one embodiment. Assume for purposes of this example that the electronic air pump 100 is in automatic mode and the needle 117 has been inserted into an object for pressurizing. A target pressure is received 510 by the electronic air pump 100. The target pressure is set using input mechanisms 112 and 113. The air pump 110 stores 515 the target pressure in memory. The electronic air pump 100 then measures 520 the air pressure. The electronic air pump 100 displays the measured air pressure on the dead front display 111. The electronic air pump 100 determines 530 whether measured air pressure is below the target pressure.

If the measured air pressure is below the target pressure then the object is under inflated (object needs to be inflated) and the electronic air pump 100 actuates 535 the pump motor 330. While air is flowing through the needle 117, the electronic air pump 100 measures 545 the air pressure and displays 560 a pressure value on the dead front display 111. In one embodiment, the value displayed is an estimated pressure value of the object determines based on the measured value and the previously described multivariate linear equation. In another embodiment, the value displayed is the value measured. The electronic air pump 100 determines 565 whether the value displayed is within a threshold of the target pressure. If the displayed value is not within the threshold (object is still underinflated), steps 535, 545, 560, and 565 are repeated.

If the air pressure in the object is initially determined 530 to be above the set target pressure (object over inflated), the electronic air pump 100 opens 540 the solenoid valve 325 for a predetermined time period, allowing the object to deflate. When the time period expires, the electronic air pump 100 closes 550 the solenoid valve 325. The electronic air pump 100 measures 555 the pressure and displays 560 the measured pressure on the dead front display 111. In one embodiment, after closing the valve 550, the pump 100 waits a set period of time (e.g., 0.5 millisecond) for pressure stabilization prior to measuring the pressure. The electronic air pump 100 determines 565 whether the value displayed is within a threshold of the target pressure. If the displayed value is not within the threshold, steps 540, 550, and 555 are repeated. On the other hand, if the pressure value displayed is within the threshold target pressure 565, the electronic air pump 100 outputs 570 an audio signal.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1A-1C, 2A-2C, 3, 4, and 5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for an electronic air pump through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving, by an electronic air pump, a target pressure for an object;
measuring, by the electronic air pump, a current air pressure of the object;
determining, by the electronic air pump, that the current air pressure of the object is greater than the target pressure; and
in response to determining that the current air pressure of the object is greater than the target pressure:
automatically deflating, by the electronic air pump, the object for a predetermined time period;
waiting a specified period of time after closing a solenoid valve before measuring a second air pressure of the object, and
outputting, by the electronic air pump, an indication that the object has been pressurized to the target pressure.

2. A method comprising:
receiving, by an electronic air pump, a target pressure for an object;
measuring, by the electronic air pump, a current air pressure of the object, wherein measuring a current air pressure of the object comprises averaging a plurality of air pressure sample measurements taken at specified intervals;
determining, by the electronic air pump, that the current air pressure of the object is less than the target pressure;
in response to determining that the current air pressure of the object is less than the target pressure:
automatically inflating, by the electronic air pump, the object for a predetermined time period; and
outputting, by the electronic air pump, an indication that the object has been pressurized to the target pressure.

3. The method of claim 1, wherein automatically deflating the object comprises opening the solenoid valve for the predetermined time period.

4. The method of claim 1, wherein the indication that the object has been pressurized to the target pressure comprises an audio signal.

5. The method of claim 1, further comprising:
   determining that the second air pressure of the object exceeds a threshold of the target pressure, the threshold comprising a maximum value;
   automatically deflating, by the electronic air pump, the object for a second predetermined period of time; and
   measuring a third air pressure of the object.

6. The method of claim 1, wherein the target pressure is based on an user input.

7. The method of claim 2, wherein automatically inflating the object for a predetermined time period comprises actuating a pump motor.

8. The method of claim 2, further comprising:
   determining that a second air pressure of the object is below a threshold of the target pressure, the threshold comprising a minimum value;
   automatically inflating, by the electronic air pump, the object for a second predetermined period of time; and
   measuring a third air pressure of the object.

9. The method of claim 2, wherein the indication that the object has been pressurized to the target pressure comprises an audio signal.

10. The method of claim 2, wherein the target pressure is based on an user input.

* * * * *